Jan. 27, 1942.　　　　P. DE MATTIA　　　　2,271,063
APPARATUS AND METHOD FOR THE MOLDING OF PLASTIC MATERIALS
Filed March 17, 1939　　　3 Sheets-Sheet 1
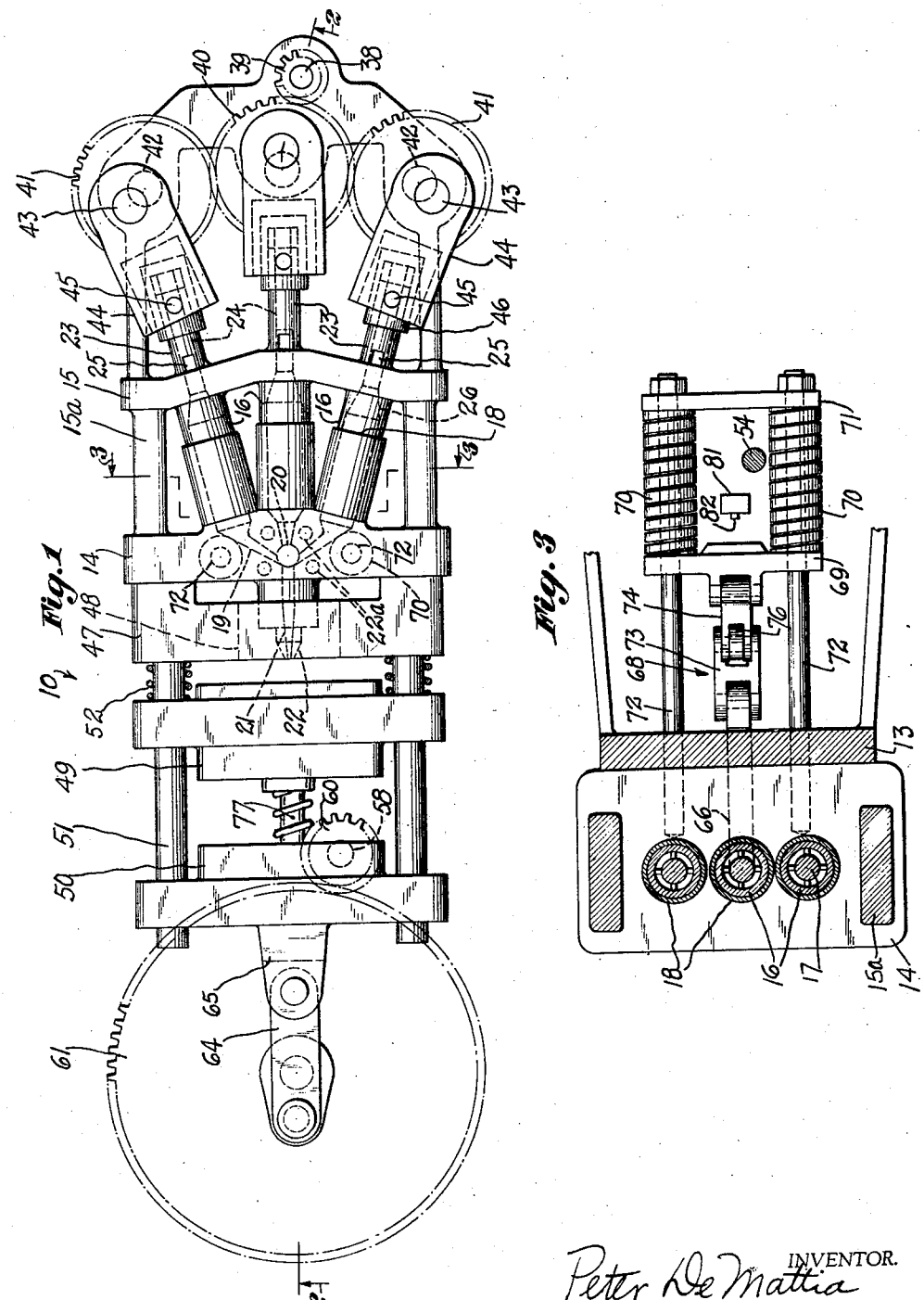
INVENTOR.
Peter De Mattia
BY
ATTORNEY.

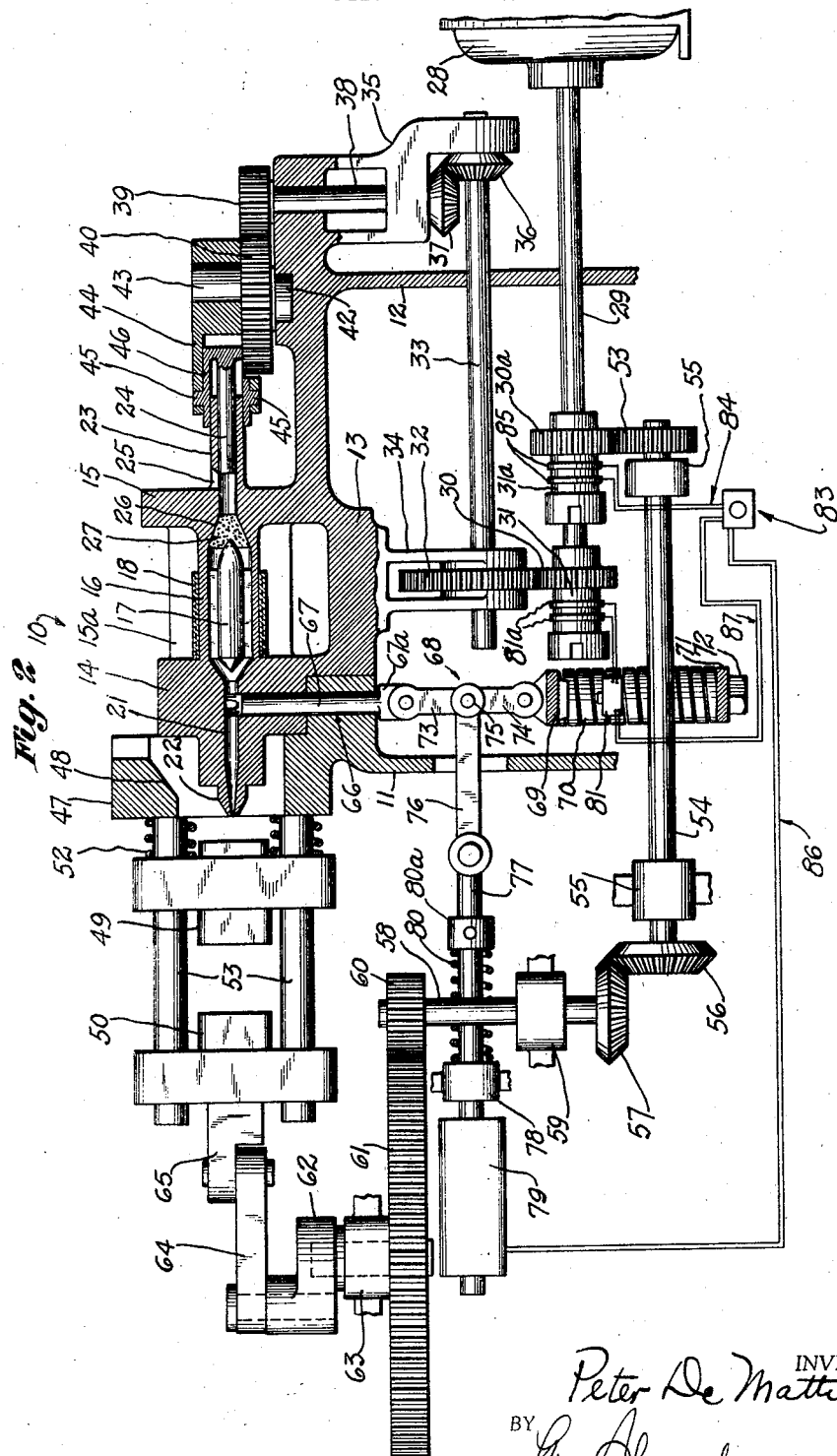

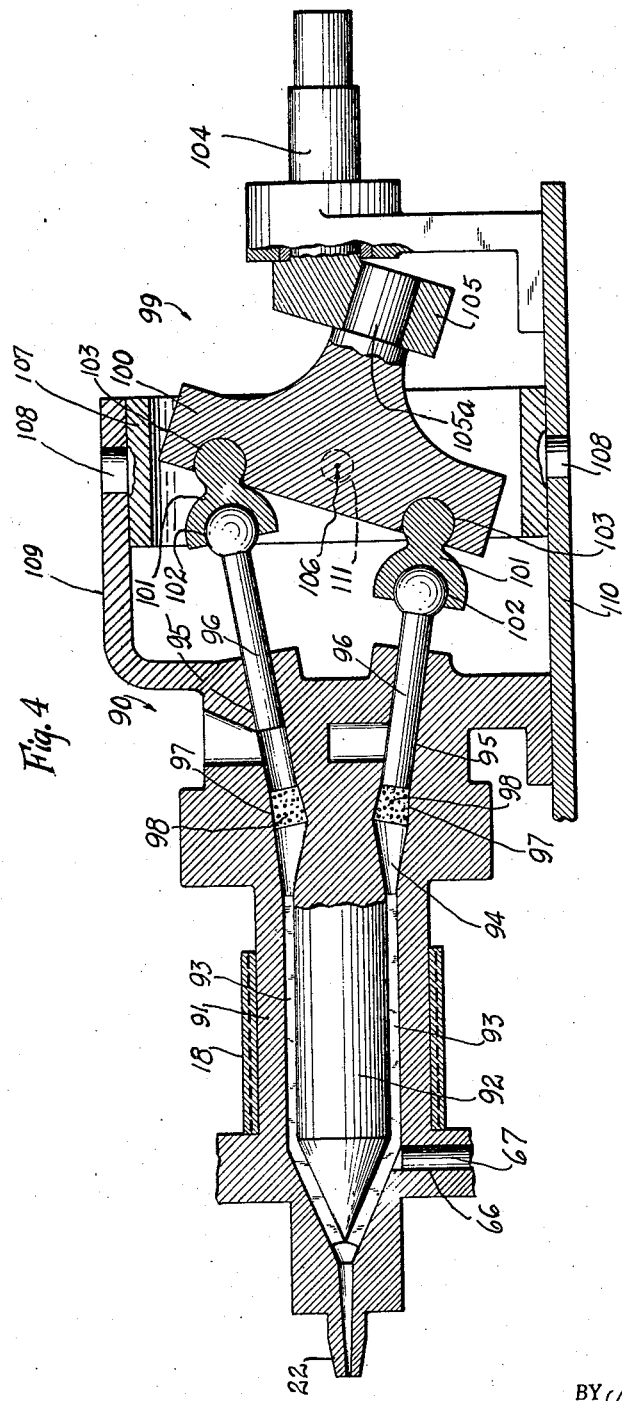

Patented Jan. 27, 1942

2,271,063

UNITED STATES PATENT OFFICE 2,271,063

APPARATUS AND METHOD FOR THE MOLDING OF PLASTIC MATERIALS

Peter De Mattia, Passaic, N. J.

Application March 17, 1939, Serial No. 262,375

20 Claims. (Cl. 18—30)

This invention relates to apparatus and methods for the molding of plastic materials by injection into a cooled die, and has particular reference to the art of supplying the plastic material under pressure to the die.

It is well known that in the art of injection molding referred to, extremely high pressures are required, so that even though the molded article is relatively small, very large and powerful machinery is required, so that the cost of the apparatus involved is unusually high. Likewise a very large amount of power is necessary not only by reason of the weight of the moving parts, but also because a considerable length of travel of the pump piston is required for feeding the plastic to the die. This invention aims to reduce the size and weight of the machinery and of the power required for operation by providing an improved multi cylinder pump.

While multi cylinder pumping devices are old per se, it has never to my knowledge been proposed to use the same for feeding in high pressure injection molding processes. It will be apparent that by using a plurality of successively operating cylinders, the torque required may be exerted continuously during a rotation of the crank shaft means instead of during only a part of such rotation as would be the case with a single cylinder. Thus the torque can be substantially reduced. But the difficulty presented itself that check valves would appear to be necessary for the outlet of each cylinder, whereas with a single cylinder no check valve was required because ejection into the die occurred only during a forward stroke of the piston.

It is therefore one object of the invention to provide improved apparatus and methods of feeding plastic material under high pressure to a cooled injection die by successive pump operation during a cycle of the crank shaft means, without the use of check valves, in an improved manner such that the pressure on the plastic shall not be lost upon piston retraction.

Another object of the invention is the provision of improved apparatus and methods of injection molding including a multi cycle pumping operation for the plastic, with each cycle including a plurality of successive operations of different pumps, whereby each stroke of a piston feeds forward only a small quantity of plastic to thus reduce the piston area and piston stroke and afford a virtually continuous feeding operation prior to or during injection of the plastic into the die. Thus articles of large and small size may be molded without requiring any interruption in the feeding as where a single piston had to repeat its long forward stroke according to the practice heretofore known, in consequence of which solidification of material in the injection nozzle or prematurely in the die often occurred.

It is thus a further object of the invention to provide a pulsating injection of plastic into a cooled die for better loading of the die, with the plastic disturbed to retard solidification until injection is complete.

Another object of the invention is to provide improved means for building up sealing plugs of plastic for the individual pumps, in lieu of check valves, these plugs being relatively non heated to maintain their compressive strength and being built up in successive stratas in an outwardly flared passage by the tamping action of the short-stroke pistons, with the forward ends of the plugs gradually feeding into the fusing chambers from which the plastic is fed to the die.

Another object of the invention is to provide a system as described with individual fusing chambers for the pumps for superior heat penetration and diminished frictional resistance for the plastic.

In the molding of plastics considerable shrinkage occurs without resultant distortion of the molded article. Hence a follow-up feed of plastic is necessary, after the main injection has been completed. Heretofore such follow-up feed depended merely on the residual pressure in the fusing chamber, and was often insufficient. Furthermore, this same residual pressure caused leakage of plastic from the injection nozzle, when the die was separated from the latter on completion of the molding operation.

It is accordingly another object of the invention to provide improved means for causing a follow-up feed of plastic after completion of the main injection, at a high pressure, desirably less than piston pressure, with the means referred to being preferably adapted to supply a variable quantity of plastic as may be required by the follow-up feed, and with said means being desirably adapted to be automatically loaded only to a required degree, as in order to replenish the plastic consumed.

Another object of the invention is to provide improved means for causing the follow-up feed to be actuable in response to pump pressure, as for example, to yield and receive plastic on the advance stroke of the piston and to feed plastic to the die on release of the high pressure on injection, during retraction of the piston.

Another object of the invention is to provide improved means for the follow-up feed of plastic to the die, such that leakage of plastic will not occur when the die is separated from the injection nozzle; thus the means may have its own piston that is retractible just before such separation occurs to cause a suction on the nozzle.

A further object of the invention is to provide improved methods and means for producing superior stratified color effects in the molded article, as by furnishing each cylinder with a plastic of a different color.

A further object of the invention is to provide a molding apparatus having improved means for controlling or cutting off operation of a pressure feeding means in response to the pressure of the material that is being fed to the machine, for example, by actuation of a spring loaded follow-up piston which is retracted by the pressure on the feeding material.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawings, wherein like parts are designated by the same reference characters throughout the several views.

In the drawings:

Figure 1 is a top plan view showing an apparatus embodying the invention.

Fig. 2 is a vertical sectional view thereof taken on the line 2—2 of Fig. 1.

Fig. 3 is a vertical sectional view taken on the line 3—3 of Fig. 1.

Fig. 4 is a vertical sectional view of a modification of the invention.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawings, therefore, are submitted merely as showing the preferred exemplification of the invention.

Referring in detail to the drawings, 10 denotes an apparatus embodying the invention. The same may include a frame 11, 12 supporting a bed plate structure 13 on which rest the upright spaced walls 14, 15, interconnected by the braces 15a. Between the walls 14, 15 extend a plurality of cylinders or fusing chambers 16 in angular relation to each other. Each of these cylinders may have a conventional axial core 17 fixedly mounted in any suitable manner, to afford an annular chamber for better penetration of heat into the plastic from a heating element such as 18 that may surround each cylinder. Extending from the cylinders or fusing means are the individual passages 19, which unite at 20 to discharge through a common duct 21 into an injection nozzle 22. Heating means may be provided at 22a.

Individually communicating with each fusing chamber 16 is a pump comprising a pump cylinder 23 having a piston 24. Plastic material may be fed to each pump in advance of its cylinder through an opening 25. Leading from each pump cylinder into its fusing chamber 16 is an outwardly tapered passage 26. It will be noted that the heating means 18 are spaced from the tapered passages 26, and if desired, the latter may be cooled, and in any case, the arrangement is such as to be conducive to the formation of a solid tamped tapering plug 27 to seal each of these passages with sufficient power to resist back pressure on retraction of a piston, whereby the use of check valves may be dispensed with. Thus the pumps may be adapted for operation in successive stages, each pump desirably executing a plurality of advance strokes prior to an injection of plastic into a die, to thus build up the plugs 27 in successive strokes, with the forward ends of the plugs gradually melting as the plugs advance into the fusing chambers 16.

For causing operation of the pumps, a motor 28 rotates a shaft 29 carrying a pinion 30 and a clutch 31, that may be combined as a unit. Engaging said pinion is a gear 32 on a shaft 33 journaled in bearing brackets 34, 35 of the machine frame. Rotated by the shaft 33 is a bevel gear 36, the teeth of which mesh with those of a bevel gear 37 fixed on a shaft 38 that is journaled in the bearing bracket 35. The shaft 38 may carry a pinion 39 which drives a gear 40 that engages a pair of like gears 41, all mounted on stub shafts 42 journaled in bearings in the bed plate structure 13. Eccentrically carried by the gears 40, 41 are the stub shafts 43 which actuate the heads 44 to which are pivoted at 45 the tubular elements 46 to which the pistons 24 are connected, said elements 46 having sleeved engagement with the pump cylinders 23. Thus the pumps are operated so that first the piston of one of them advances, and then the piston of another and finally the piston of the third advances. In this manner, the driving torque is distributed throughout a rotation of the driver pinion 39, whereby the force required and stress generated is substantially less than if a single pump were used.

Mounted on the frame 11 is a bumper plate 47 having an opening 48 for the nozzle 22, the bumper plate being suitably adjustable to provide the desired pressure contact of the nozzle with the die. The latter may include a plurality of die members 49, 50 movable into open and closed positions, away from and toward each other, these die members being slidable along the supporting guide bars 51 affixed to the plate 47. Interposed between the latter and the die member 49 are the compression coil springs 52 that extend around the guide bars 51, and serve to move the die member 49 out of engagement with the injection nozzle 22.

For causing operation of the cooled die members 49, 50, any suitable drive may include a pinion 30a on the motor drive shaft, and a clutch 31a for said pinion, like the clutch 31. Rotated by the pinion 30a is a pinion 53 on a shaft 54 journaled in bearings 55, and causing rotation of a bevel gear 56. The latter may engage a bevel gear 57 on a shaft 58 journaled in a bearing 59, and carrying a pinion 60. Driven by the latter is a gear 61 which rotates a crank shaft 62 journaled in a bearing 63. The crank shaft actuates a connecting rod or link 64, which engages the lug 65 of the die member 50. Hence the latter may be moved toward the die member 49 into engagement therewith, whereupon the die member 49 is moved into engagement with the nozzle 22, with the springs 52 being compressed. Now injection of plastic into the die occurs, whereupon the crank shaft 62 causes the die members to return to the open position shown.

To provide a follow-up feed of plastic upon solidification and consequent shrinkage of the molded material, I provide an expandible resilient chamber such as a pump cylinder 66 communicating with plastic conduit as at 20, and having therein a piston 67 connected by any suitable means 68 with a head 69. Balancingly actuating the same are a plurality of compression coil springs 70 seated on a plate 71 fixedly secured by the bolts 72 around which the springs extend. Preferably these bolts are adjustable to adjust the initial compression on the springs 70. Thus the piston 67 is upwardly resiliently actuated by the springs 70, as far as permitted by the stop shoulder 67a, and is downwardly movable by the pressure of the plastic, generated by the pumps 23. When the springs 70 are fully closed in compressed condition, they may serve as a stop to limit motion of the piston 67. Desirably the average power of the springs 70 is such as to be less than the maximum attained pressure of the plastic. But when the pressure of the plastic drops upon injection into the die, the piston 67 is operative to cause the follow up feed of fused plastic from the reservoir chamber 66.

Just before the die is moved away from the injection nozzle 22, in order to prevent leakage of the plastic from the nozzle, it is desirable to greatly diminish the pressure or even to cause some suction back of the nozzle. For this purpose suitable means may be provided to retract the piston 67 prior to opening of the die. For example, I may construct the means 68 in the form of a toggle, which includes links 73, 74 to whose center pin 75 is conneted an actuator means to forcibly break the toggle. The actuator means may include a link 76 connected to a bar 77 slidably movable in the fixed guide 78. For retracting the bar 78 to break the toggle 68, a solenoid 79 or other power means may be provided, of which solenoid the bar 78 may form the core. For straightening the toggle to the position shown, an expansion coil spring 80 may act between the guide 78 and a collar 86a fixed on the bar 77. Operation of the solenoid 79 in suitably timed relation to the die may be caused as hereinafter described.

Preferably, the toggle 68 is returned to the operative position shown immediately after the die 49, 50 is again closed, in order that the piston 67 shall force the residual plastic in the cylinder 66 into the die before the plastic pressure is built up by the pumps 23.

I have found it to be highly advantageous to momentarily stop the drive means of the pumps 23 in response to a predetermined pressure of the plastic, such pressure being attained just prior to injection into the die. This permits adjustment for plastics of different flow viscosities. Desirably I arrange such control in response to the fully collapsed or compressed condition of the springs 70. Thus I may provide a switch 81 having an actuator 82 adapted to be operated by the cross head 69 when the latter moves downward to its stopped position. The switch 81 may electromagnetically control the drive, for instance, by controlling the clutch 31, as at the ring contacts 81a, so as to connect or disconnect the pinion 31 with the motor shaft 29 in any suitable manner, preferably in a timed relation to the die as hereinafter disclosed. Of course, when the follow-up feed occurs, the cross head 69 elevates to release the switch 81, whereupon the latter automatically causes the clutch 31 to engage the pinion 31 with the shaft 33 to start operation of the pump drive. Vice versa, when the cross head 69 engages the switch 81, the latter actuates the clutch to cause release of the pinion.

For suitably timed operation of the die 49, 50, any time clock switch 83 may be connected at 84 with contact rings 85 of the clutch 31a to connect and disconnect the pinion 30a with the constantly rotating motor shaft 29. Thus the time period for the molding operation may be adjusted. Likewise the solenoid 79 may be connected at 86 to the time switch 83, for suitable timed operation of the piston 67 relative to the die. For instance, the solenoid is energized just before the die opens, to break the toggle 68 and retract the piston 67. Immediately after the die is closed, the solenoid is deenergized so that the spring 70 causes the piston 67 to be upwardly projected to expel residual plastic in the cylinder 66 into the die before the pumps 23 built up a substantial pressure of plastic.

It may also be advantageous to connect the switch 81 to the time clock 83, so that the closing of the circuit of this switch may be controlled by the latter. Thus even if the switch 81 is in position to cause the clutch 31 to engage, such engagement may not occur until permitted by the time clock. Thus if the time for a molding operation is substantial, the feeding of plastic by the pumps is correspondingly retarded or timed. The connection referred to is at 87.

It will be understood that in actual practise the apparatus herein shown may be constructed in different parts for easy manufacture assembling and adjustment. For instance, the cylinders 23 may be separate and may be mounted between separate plates 14, 15 which may be bolted together at 15a. The bearing frame for the stub shafts 39, 42 may be separate and bolted to the front plate 14. The bumper plate 47 may be separate of the frame 11 and suitably secured thereto, and similarly other parts may be designed to effectuate the actions herein referred to, in the simplest manner in actual manufacture. It will be further understood that various gear ratios and other drive details may be such as to effectuate the operation that will now be described in detail.

In operation, while this invention may be applicable to the molding of various materials, it is especially intended for the molding of plastics such as those which are adapted to flow or become fused under heat and pressure. For example, the invention is applicable to apparatus and method of making slide fasteners, disclosed in my application, Serial No. 197,799, filed March 24, 1938. In the molding of the plastics, this invention contemplates a cooled die wherein the plastic solidifies almost instantaneously. In consequence, extremely high pressures are needed to cause the plastic to flow at a reasonably low temperature, such as will not cause disintegration of the plastic, and to cause the molded article to accurately reproduce the configuration of the die. According to the present invention, a pump means 23 is arranged to complete preferably two or more pumping cycles for each single injection of plastic into the die 49, 50. The pump means comprises a plurality of pumps 23 arranged to operate in successive stages, say of 120 degrees each. Accordingly with three pumps and a two cycle pump operation, each pump 23 may complete two entire piston actions, and thus there may be six successive stages. The torque at the driver pinion 39 is thus distributed through complete rotations thereof, whereby the required force for pump operation is greatly diminished, resulting in a smaller machine, the consumption of less power, and important advantages in the feeding and molding operations. An especial advantage is in the substantially continuous molding of articles as in molding slide fastener teeth directly on a stringer. The various pumps 23 may discharge into a fusing means or chamber, which preferably includes individual chambers 16 for the pumps 23. The latter or the chambers 16 may have communicating passages 26 which taper toward the pumps, with the heating means being suitably designed so that the granular plastic in these passages 26 is not softened, and hence is adapted to form hard tapered sealing plugs of the plastic as at 28, compacted by the tamping action of the short stroke pistons 24. I have discovered that in actual practise, this principle is wholly feasible and renders simple and practical the multi stage pump structure herein disclosed, since the pressure caused on the advance stroke of one piston can not be released on retraction of the next piston. As the pistons 24 add successive stratas of plastic to the plugs 28, the latter move forward and thus supply plastic under high pressure to the fusing cylinders 16. In the latter, heat penetration is rapid, not only because of the annular flow chambers therein, but because the use of a plurality of the fusing cylinders permits a small annular flow passage to be used in each. Of course the die is closed and in engagement with the nozzle 22 just before the pumps 23 begin to operate. When injection is occurring, a pulsating flow of plastic occurs through the cylinders 16, the nozzle 22 and within the die, due to the successive stage operation of the pumps. Hence premature solidification in whole or in part is prevented at any point along the line of flow according to the principle that solidification is arrested by a mechanical disturbance. This assures superior and complete loading of the die. As the pressure along the line of flow builds up, prior or during injection of the plastic into the die, an expandible reservoir becomes loaded with the soft plastic to furnish a follow-up feed of plastic to the die to take care of contraction due to solidification of the molded material. For instance, the expandible reservoir may communicate with the die or at a point back of the nozzle 22, with the piston 67 moving outward against the force of the springs 70, and until suitably stopped. Preferably the average spring pressure is less than the injection pressure of the plastic. As the pressure of the latter drops upon injection, the springs 70 acting through the toggle 68 cause the piston 67 to discharge a follow-up feed of plastic into the die, and before the die opens or moves away from the injection nozzle, the toggle 68 is forcibly broken to retract the piston 67 and cause some suction to prevent leakage of plastic at the nozzle. Upon breaking the toggle, the head 69 may move only slightly upward since the springs 70 have a limited expandibility. This operation of the piston and/or the springs 70 may be used to control the pumps 23, so that when the springs are compressed the cross head 69 actuates the switch 81 to operate a clutch as at 31 to cause the drive to stop, and upon the follow-up movement of the piston 67, the cross head may release the switch to cause the clutch to engage for operation of the drive to start a new cycle, when the die is closed, as determined by the time clock 83. In regard to the operation of the die 49, 50, it will be sufficient to note that the timing thereof is such that the die is first closed and engaged with the nozzle 22, whereupon the pumps 23 begin to operate in successive stages to complete two cycles of pump operation with consequent injection and advance of the follow-up piston 67, then retraction of the latter, followed by opening of the die. After the die again closes, the piston 67 is moved upward just as the pumps 23 begin to operate, so that the piston 67 may expel residual plastic from the reservoir 66 into the die. By adjusting the compression on the springs 70, the pumps 23, as controlled by the switch 81, are caused to continue to operate until a desired pressure of plastic has been attained, whereby the injection pressure can be made to suit different viscosities of the plastic.

The invention permits different stratified color effects to be produced in the molded article by supplying different colors to the different pumps, these colors being injected into the die through individual nozzles or a common nozzle 22, according to the degree of mixing required.

The cycle may be tabulated as follows:

| | Die | Operation of pumps 23 | Operation of piston 67 |
|---|---|---|---|
| 1 | Just closed | Begins | Advanced upward by 68 to expel residual plastic. |
| 2 | Closed | Pressure and injection | Moved downward by the plastic. |
| 3 | ----do---- | Stopped | Down position. |
| 4 | ----do---- | ----do---- | Moved up by 70 for follow-up feed. |
| 5 | ----do---- | ----do---- | Retracted by 68 to avoid leakage. |
| 6 | Opens | ----do---- | Same. |

In Fig. 4 is shown a modified apparatus embodying the invention and characterized by a plurality of cylinders feeding plastic into a single fusing chamber. Thus the apparatus may include a fusing chamber 91, having a heating jacket 18, and an injection nozzle 22. Within the chamber is a core 92 affording angularly spaced bores or passages 93 extending in separate relation to each other from the rear end of chamber up to the entrance to the injection nozzle. At the latter is a cylinder 66 for a piston 67 arranged and operative as hereinbefore described. At their rear ends, the passages 93 may be flared as shown at 94. Alternately, the chamber 91 may be replaced by the chamber 16. By the provision of the passages 93 cross or transverse currents of solid, or of solid and fused plastics, which would otherwise be caused by the alternate feeding action of the pistons is prevented, so that the sealing plugs are not broken or disintegrated. In general, the higher the temperature of the cylinder, or the more fused plastic present therein, the more important is the provision of the passages 93.

Communicating individually with the passages at 94 are the cylinders 95, having pistons 96 therein. Preferably I employ six equally angularly spaced cylinders 95 for as many passages 93. These cylinders and pistons are constructed and operate like those shown at 23, 24 and may follow a like cycle. At their forward ends, the cylinders diverge as shown at 97, beyond the extreme point of forward travel of the pistons. This arrangement corresponds in principle to the divergent portion shown at 26 and results in the formation of individual sealing plugs 98 functioning like the plug 27.

For successively actuating all the pistons, a novel single crank means 99 is employed. The same may include a plate 100 of generally disc form to which the pistons are connected by individual elements or connecting rods 101, each having universal or ball engagement at its opposite ends at 102, 103 with the pistons and with the member 100, respectively. For operating the member 100, a rotary power shaft 104 is provided with a crank 105 at an oblique angle thereto, and rotatably connected at 105a to the member 100. The arrangement is such that there is alinement of the shaft 104, chamber 91, the axis of the circular series of cylinders 95, and the center of oscillation 106 of the member 100. This center of oscillation may be fixed by any universal joint, for instance, of the gimbal type used for a compass, exemplified by a vertical ring 107, having alined vertical trunnions 108 journaled in fixed frame members 109, 110. Extending inward from the ring 107 are the opposed alined trunnions 111 on which the crank head 100 is journaled. Thus the latter can oscillate about the vertical axis at 108 and about the horizontal axis at 111.

The operation of the apparatus 90 is in general like that of the apparatus 10, except that the differently colored plastic of the different cylinders 95 are maintained separated up to the injection nozzle 22, to avoid undue intermixing of the colors. The individual plastic plugs 98 will prevent movement of one of them from affecting any of the others. The structure for actuating the cylinder pistons is greatly simplified as will be apparent, the single shaft 104 causing a wave like circular oscillation of the single member to successively move the several pistons forward and rearward. More specifically, the motion of the member 100 is such that successive radii thereof from the point 106 are successively oscillated along equal paths.

It will be noted that the shaft 104 may make a single rotation for one cycle of the apparatus, referring to the feeding of the die and the complete molding of the article. Further, the shaft may make more than one rotation for each such cycle, and if desired, it may make ⅔ of a rotation or 1⅓ rotation for each such cycle as may be necessary, all in accordance with the method as described for the apparatus 10.

I claim:

1. An apparatus for the injection molding of plastics under high pressure in a cooled die, including a die, means for fusing a plastic and injecting the same into the die, the fusing means including a heat source, a plurality of pumps for feeding solid plastic into the fusing means, actuator means for causing the different pump pistons to successively advance for feeding the plastic, and passage means interconnecting the pumps with the fusing means, providing passages tapering toward the pumps and being spaced from said heat source so as to cause the formation of sealing plugs of solid plastic to prevent release of pressure on retraction of a pump piston, said actuator means causing relatively short feeding strokes of the pump pistons for a tamping-like action on the plastic whereby said passage means and pumps are capable of causing a gradual feed of the sealing plugs toward the fusing means with the material of the sealing plugs being continuously replenished by the layers of plastic supplied thereto by the pump pistons.

2. An apparatus for the injection molding of plastics under high pressure in a cooled die, including an injection receiver for plastic, having means for heating the same, a plurality of pumps for feeding solid plastic to said receiver under high pressure to effect the injection, the pumps and receiver having communicating passages remote from the heating means and tapered toward the pumps to build up and maintain solid sealing tapered plugs of the plastic to prevent release of pressure on retraction of a piston, and means for causing the different pump pistons to successively advance on their feeding strokes.

3. An apparatus for the injection molding of plastics under high pressure in a cooled die, including an openable die, means for fusing a plastic material and injecting the same into the die, the fusing means having a heating means, drive means for causing relative movement of the die and the fusing means into and out of communication with each other, a plurality of pumps for feeding solid plastic to the fusing means, the latter and the pumps having communicating passages so related to the heating means as to leave the plastic in said passages substantially unaffected by the heating means, said passages tapering toward the pumps to form sealing plugs, and actuator means for causing operation of the pump pistons in a plurality of cycles while the die is in operative communication with the fusing means, each cycle including feeding strokes of the different pump pistons in successive stages, caused by the actuator means, said feeding strokes being relatively short so as to tamp tapered sealing plugs of plastic in the said passages with the plugs gradually advanced so that their forward ends continuously supply plastic to the fusing means.

4. A molding apparatus including a die, pressure means for supplying molding material to the die, and a resiliently expansible reservoir communicating with the pressure means to receive material therefrom and to supply a follow-up feed of material to the die upon completion of the supplying of material to the die by the pressure means, said reservoir being adapted to be expanded by pressure on the material caused by the pressure means, and being capable of exerting a pressure normally substantially less than the normal working pressure of said pressure means.

5. An apparatus according to claim 3, wherein the fusing means includes cylinders for individually receiving plastic from the different pumps, said cylinders having a common nozzle for injection of plastic into the die.

6. The method of molding plastics by injection, including intermittently feeding and compressing a granular plastic at different points in rapid successive stages while maintaining the plastic relatively cool to form a sealing plug of the plastic at each of said points while forming the plugs with a taper to resist back pressure in advance of the plugs, and causing the plugs to thus gradually advance, and constantly melting the material in advance of the plugs and causing said forward pressure to produce corresponding successive injections of the melted plastic into a cooled die for substantially instantaneous solidification therein.

7. A molding apparatus including a die, pressure means for supplying molding material to the die, and a resiliently expansible reservoir communicating with the pressure means to receive material therefrom and to supply a follow-up feed of material to the die upon completion of the supplying of material to the die by the pressure means, said reservoir being adapted to be expanded by pressure on the material caused by the pressure means, and means responsive to the reservoir in its expanded condition to cause the pressure means to cease operation.

8. A molding apparatus including molding means comprising an openable die, a pressure means for feeding molding material to the die, the latter and the molding means being movable into and out of communication with each other, a reservoir chamber communicating with the molding means, a piston in the reservoir chamber, a spring, a collapsible-expandible means between the spring and the piston such that the spring causes an advance stroke of the piston with the collapsible-expandible means being in expanded position, and actuator means cooperating with the spring and with the collapsible-expandible means for moving the collapsible-expandible means to collapsed or to expanded position, to collapse the same for retracting the piston and to expand the same for advancing the piston and to adapt the piston to be further advanced by the spring, and the piston being subject to the pressure in the reservoir chamber to retract against the force of the spring and independently of the actuator means with the latter idle in its piston advancing position, said actuator means causing retraction of the piston prior to opening of the die and causing advance of the piston upon closing of the die, and the spring permitting the piston to yieldably retract under reservoir pressure and causing the piston to advance to supply a follow-up feed of molding material to the die prior to retraction of the piston by the actuator means.

9. An apparatus for the injection molding of plastics under high pressure in a cooled die, comprising a fusing means for the plastic, a plurality of angularly spaced pumps for feeding plastic to said fusing means, the latter and the cylinders of the pumps having communication with each other along passages that diverge toward the fusing means, said passages being adapted to form therein solid sealing plugs of the plastic to prevent release of pressure at a point where the piston of a pump is being retracted, and means for successively actuating the pistons of the pumps, comprising a shaft having an oblique crank, a member connected thereto so that successive like points on the member are successively moved to and fro to an equal extent upon rotation of said shaft, and universal means connecting the individual pistons to successive points of said member for successive like operation of the pistons upon rotation of said shaft.

10. An apparatus for the injection molding of plastic under a high pressure in a cooled die, including a die, a receiver for fusing a plastic and for injecting the same into the die, the receiver including a heat source, a plurality of pumps for feeding solid plastic into the fusing means at an end thereof remote from the die, actuator means for causing the different pump pistons to successively advance for feeding the solid plastic into the receiver, and individual passages for the pumps connecting the same with the receiver, said passages tapering toward the pumps and being so related to the heat source as to leave the material therein substantially unaffected by the heat source so as to form sealing plugs of plastic therein, said actuator means causing relatively short feeding strokes of the pump pistons for a tamping-like action on the solid plastic to avoid upsetting the sealing plugs, and said receiver having passages communicating with the tapered passages and extending therefrom toward the injection end of the receiver for a sufficient distance to prevent the feeding action of one piston from affecting the static condition of an adjacent sealing plug at a piston that may be in retracting motion.

11. An apparatus for the injection molding of plastics under a high pressure in a cooled die, including a die, a receiver for fusing a plastic and for injecting the same into the die, the receiver including a heat source, a plurality of pumps for feeding solid plastic into the fusing means at an end thereof remote from the die, actuator means for causing the different pump pistons to successively advance for feeding the solid plastic into the receiver, and individual passages for the pumps connecting the same with the receiver, said passages tapering toward the pumps and being so related to the heat source as to leave the material therein substantially unaffected by the heat source so as to form sealing plugs of plastic therein, said actuator means causing relatively short feeding strokes of the pump pistons for a tamping-like action on the solid plastic to avoid upsetting the sealing plugs, and said receiver having passages communicating with the tapered passages and extending therefrom into proximity to the heating means, at a point remote from the tapered passages, to prevent formation of transverse currents of solid and fused plastic breaking up the sealing plug as a result of the alternate feeding action of the pistons.

12. A molding apparatus including a die, pressure means for supplying molding material to the die, a resiliently expansible reservoir communicating with the pressure means to receive material therefrom and to supply a follow-up feed of material to the die upon completion of the supplying of material to the die by the pressure means, said reservoir being adapted to be expanded by pressure on the material caused by the pressure means, and collapsible means for causing the reservoir to resiliently compress the plastic therein when the collapsible means is in extended position and to relieve said pressure of the reservoir when the collapsible means is collapsed.

13. A molding apparatus including a die, a heated receiver having at one end a nozzle for injecting plastic into the die, pressure means for supplying molding material to the receiver at the other end thereof, and a resiliently expansible reservoir communicating with the receiver at the nozzle end thereof to receive material therefrom and to supply a follow-up feed of material to the receiver upon completion of the supplying of material to the receiver by the pressure means, said reservoir being adapted to be expanded by pressure on the material caused by the pressure means, other means for independently expanding the reservoir, and means for intermittently actuating the pressure means.

14. A molding apparatus including a die, a pressure means for feeding molding material to the die, a chamber communicating with the pressure means and having a piston responsive to pressure on the material caused by the pressure means, a spring that is expansible to advance the piston, said piston serving to feed a follow-up charge of material to the die to allow for contraction due to solidification, collapsible, expansible toggle means forming a movable link between the spring and piston, and means to control the expansible-collapsible action of the toggle means.

15. A molding apparatus including a die, pressure means for supplying molding material to the die, and a resiliently expansible reservoir communicating with the pressure means to receive material therefrom and to supply a follow-up feed of material to the die upon completion of the supplying of material to the die by the pressure means, said reservoir being adapted to be expanded by pressure on the material caused by the pressure means, and means responsive to the reservoir in its expanded condition to cause the pressure means to cease operation, and said means being responsive to the reservoir in a contracted follow-up position thereof to initiate operation of the pressure means.

16. A device including a die member, a receiver member having a nozzle at one end thereof, a pump for feeding a plastic material to the receiver at the other end of the receiver member, means for causing relative movement between said members so that the nozzle engages and disengages the die member, means for causing operation of the pump only while the nozzle engages the die member, and means connected to the receiver member at the nozzle for abstracting a quantity of molding material adjacent to the entrance of the nozzle to prevent leakage of molding material from the nozzle at the instant that the nozzle separates from the die member, and means for causing the said abstracting means to return said material to the receiver member when the nozzle is again in engagement with the die member.

17. The method of molding plastics by injection, including intermittently feeding along a path a solid plastic under high pressure to a heated fusing region wherein the pressure is substantially maintained, comprising maintaining the plastic material at a section of said path in the form of a plug tapered in a direction opposite to the direction of advance of the plastic material and maintaining the said plug at such a temperature that it will not fuse, whereby the plug forms a solid seal preventing reverse flow of the plastic material, and causing the feeding of solid plastic toward said plug to be in such limited amounts that the plug will not be jarred and broken, whereby the material of the plug is fed forward toward the fusing region and is constantly replenished at the small end thereof.

18. A molding apparatus including a die, a reservoir therefor, a pressure means for feeding molding material to the reservoir, actuator means for the pressure means, the reservoir and the die being movable into and out of communication with each other, a chamber communicating with the reservoir and having a spring pressed piston responsive to pressure on the material caused by the pressure means, said piston serving to feed a follow-up charge of material to the die to allow for contraction due to solidification, and releasable means coordinated with the actuator means for retracting the piston while the die and the reservoir are in communication with each other.

19. The method of molding plastics by injection, including feeding, compressing and melting plastics of different colors separately and successively, and injecting the differently colored plastics in rapid succession into a cooled die cavity to produce a succession of relatively distinct colors in the die cavity in casting an article, each injection of a plastic of one color having a mass substantially less than that of the article, and the rapidity of the successive injections being sufficiently great to prevent solidification of plastic in the die cavity before all the required injections of the plastics of different colors have been effected to produce the article, whereby the resultant article is homogeneous and has different sections of different distinct colors.

20. The herein described method, including molding an article out of a melted plastic by injecting the melted plastic at high pressure into a cooled die cavity for substantially instantaneous solidification, and exerting a series of pressure impacts on the plastic during injection of the plastic into the die thereby causing a pulsating pressure flow of the melted plastic to interrupt solidification until the die cavity is substantially fully loaded.

PETER DE MATTIA.